(12) United States Patent
Kull

(10) Patent No.: US 8,924,117 B2
(45) Date of Patent: Dec. 30, 2014

(54) BRAKE MONITORING SYSTEM FOR AN AIR BRAKE ARRANGEMENT

(75) Inventor: Robert C. Kull, Olney, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 110 days.

(21) Appl. No.: 13/464,080

(22) Filed: May 4, 2012

(65) Prior Publication Data

US 2013/0297163 A1    Nov. 7, 2013

(51) Int. Cl.
*B60T 17/22* (2006.01)
*F16D 66/00* (2006.01)
*G06F 11/30* (2006.01)

(52) U.S. Cl.
USPC ............................................. 701/70; 303/128

(58) Field of Classification Search
USPC .......... 701/70, 20, 19, 32, 6; 303/3, 15, 20, 7, 303/6.1, 128; 702/114
See application file for complete search history.

(56) References Cited

U.S. PATENT DOCUMENTS

| | | |
|---|---|---|
| 2,993,199 A | 7/1961 | Browne et al. |
| 3,957,314 A | 5/1976 | Falke |
| 4,041,470 A | 8/1977 | Slane et al. |
| 4,487,060 A | 12/1984 | Pomeroy |
| 4,553,723 A | 11/1985 | Nichols et al. |
| 4,817,019 A | 3/1989 | Morihara |
| 5,201,834 A | 4/1993 | Grazioli et al. |
| 5,267,473 A | 12/1993 | Bezos et al. |
| 5,330,034 A * | 7/1994 | Rancourt et al. ............. 188/71.6 |
| 5,390,988 A | 2/1995 | Shank |
| 5,394,137 A | 2/1995 | Orschek |
| 5,445,347 A | 8/1995 | Ng |
| 5,451,099 A | 9/1995 | Hart et al. |
| 5,544,057 A | 8/1996 | Matsuoka |
| 5,613,741 A | 3/1997 | Shank |
| RE35,590 E | 8/1997 | Bezos et al. |
| 5,654,889 A | 8/1997 | Wood et al. |
| 5,662,391 A | 9/1997 | McKay |
| 5,671,015 A | 9/1997 | Yagi et al. |
| 5,676,431 A | 10/1997 | McLaughlin et al. |
| 5,709,436 A | 1/1998 | Scott |
| 5,738,311 A | 4/1998 | Fernandez |
| 5,744,707 A | 4/1998 | Kull |
| 5,758,848 A | 6/1998 | Beule |
| 5,808,909 A | 9/1998 | Rees |
| 5,813,635 A | 9/1998 | Fernandez |
| 5,817,934 A | 10/1998 | Skantar |
| 5,862,048 A | 1/1999 | Knight |
| 5,869,765 A | 2/1999 | Scott et al. |
| 5,892,437 A | 4/1999 | Scheibe et al. |

(Continued)

FOREIGN PATENT DOCUMENTS

| | | | | |
|---|---|---|---|---|
| JP | 5957053 A | 4/1984 | | |
| JP | 402141354 A * | 5/1990 | ................ | B60T 8/58 |

(Continued)

*Primary Examiner* — Marthe Marc-Coleman
(74) *Attorney, Agent, or Firm* — The Webb Law Firm

(57) ABSTRACT

A brake monitoring system for an air brake arrangement including: at least one sensor to measure air pressure in at least one component of an air brake arrangement; at least one local controller to determine air brake data; and at least one communication device to transmit at least a portion of the air brake. An air brake arrangement and a computer-implemented method of determining air brake data in an air brake arrangement are also disclosed.

20 Claims, 2 Drawing Sheets

(56) References Cited

U.S. PATENT DOCUMENTS

| | | |
|---|---|---|
| 5,924,774 A | 7/1999 | Cook et al. |
| 6,024,419 A * | 2/2000 | Waldrop et al. ............ 303/3 |
| 6,094,977 A | 8/2000 | Vaughn |
| 6,172,619 B1 | 1/2001 | Lumbis et al. |
| 6,175,784 B1 | 1/2001 | Jicha et al. |
| 6,189,980 B1 | 2/2001 | Kull |
| 6,206,483 B1 | 3/2001 | LaLone |
| 6,269,682 B1 | 8/2001 | Vaughn |
| 6,301,531 B1 | 10/2001 | Pierro et al. |
| 6,302,495 B1 | 10/2001 | Peltz |
| 6,322,025 B1 | 11/2001 | Colbert et al. |
| 6,327,894 B2 | 12/2001 | Vaughn |
| 6,352,315 B1 | 3/2002 | Yin et al. |
| 6,400,281 B1 | 6/2002 | Darby, Jr. et al. |
| 6,425,282 B2 | 7/2002 | Vaughn |
| 6,457,782 B1 | 10/2002 | Truglio et al. |
| 6,474,150 B1 | 11/2002 | Berg et al. |
| 6,626,034 B2 | 9/2003 | Marra et al. |
| 6,629,709 B1 | 10/2003 | Tunley et al. |
| 6,648,424 B2 | 11/2003 | Vaughn |
| 6,648,425 B2 | 11/2003 | Marra et al. |
| 6,668,216 B2 | 12/2003 | Mays |
| 6,669,308 B1 | 12/2003 | Aurich et al. |
| 6,748,303 B2 | 6/2004 | Hawthorne |
| 6,823,242 B1 | 11/2004 | Ralph |
| 6,837,550 B2 | 1/2005 | Dougherty et al. |
| 6,850,869 B2 | 2/2005 | Pierro et al. |
| 6,867,708 B2 | 3/2005 | Darby, Jr. et al. |
| 6,980,127 B2 | 12/2005 | Lumbis et al. |
| 6,997,418 B1 | 2/2006 | Sanzone |
| 7,038,597 B2 | 5/2006 | Smith |
| 7,040,150 B2 | 5/2006 | Hawthorne et al. |
| 7,054,777 B2 | 5/2006 | Crane et al. |
| 7,073,753 B2 | 7/2006 | Root et al. |
| 7,219,067 B1 | 5/2007 | McMullen et al. |
| 7,373,224 B2 | 5/2008 | Goetz et al. |
| 7,386,376 B2 | 6/2008 | Basir et al. |
| 7,416,262 B2 | 8/2008 | Ring |
| 7,627,546 B2 | 12/2009 | Moser et al. |
| 7,664,459 B2 | 2/2010 | Smith, Jr. et al. |
| 7,769,509 B2 | 8/2010 | Gaughan et al. |
| 8,038,226 B2 | 10/2011 | Knornschild et al. |
| 2001/0015575 A1 | 8/2001 | Truglio et al. |
| 2002/0019688 A1 | 2/2002 | Mantini et al. |
| 2002/0027495 A1 | 3/2002 | Darby, Jr. et al. |
| 2002/0116992 A1 | 8/2002 | Rickel |
| 2002/0153765 A1 | 10/2002 | Levy et al. |
| 2002/0188593 A1 | 12/2002 | Moser et al. |
| 2003/0200020 A1 | 10/2003 | Ring |
| 2004/0046442 A1 | 3/2004 | Aurich et al. |
| 2004/0122566 A1 | 6/2004 | Horst et al. |
| 2004/0192348 A1 | 9/2004 | Gudmundsson et al. |
| 2005/0001471 A1 * | 1/2005 | Hart ............................ 303/3 |
| 2005/0171696 A1 | 8/2005 | Naden et al. |
| 2005/0205719 A1 | 9/2005 | Hendrickson et al. |
| 2005/0283285 A1 | 12/2005 | Ying |
| 2006/0047379 A1 | 3/2006 | Schullian et al. |
| 2006/0074581 A1 | 4/2006 | Crane et al. |
| 2006/0195327 A1 | 8/2006 | Kumar et al. |
| 2006/0290199 A1 | 12/2006 | Beck et al. |
| 2009/0069961 A1 | 3/2009 | Deepak et al. |
| 2009/0206651 A1 | 8/2009 | Wright |
| 2009/0218179 A1 * | 9/2009 | Yokoyama et al. ...... 188/1.11 L |
| 2009/0306871 A1 * | 12/2009 | Alford et al. ................ 701/71 |
| 2010/0109426 A1 | 5/2010 | Fugiel et al. |
| 2010/0295366 A1 | 11/2010 | Bradley et al. |
| 2010/0327653 A1 | 12/2010 | Wygnanski et al. |
| 2011/0029167 A1 | 2/2011 | Itano et al. |
| 2011/0270475 A1 * | 11/2011 | Brand et al. ................ 701/20 |

FOREIGN PATENT DOCUMENTS

| | | | |
|---|---|---|---|
| JP | 6156233 A | 6/1994 | |
| JP | 407315187 A * | 12/1995 | ............ B60T 8/34 |
| JP | 2000071964 A | 3/2000 | |
| WO | 2005059503 A1 | 6/2005 | |
| WO | 2006074028 A1 | 7/2006 | |

* cited by examiner

BRAKE MONITORING SYSTEM FOR AN AIR BRAKE ARRANGEMENT

BACKGROUND OF THE INVENTION

1. Field of the Invention

The present invention relates generally to brake monitoring systems and arrangements for use in connection with an air brake arrangement, and in particular to a brake monitoring system and an air brake arrangement for a train, railcar, railway vehicle, and similar vehicles, and preferably an electronically-controlled pneumatic air brake arrangement for a railway vehicle.

2. Description of the Related Art

As is known, braking systems and arrangements are required for slowing and stopping vehicles, such as cars, trucks, trains, railcars, railway vehicles, and the like. With specific respect to trains and other railway vehicles, the braking system is normally in the form of a pneumatically-driven arrangement (or "air brake arrangement") having mechanisms and components that interact with each railcar. A known air brake arrangement BA is illustrated in schematic form in FIG. 1.

With reference to FIG. 1, the operator of a train TR also has control over the braking arrangement BA through the use of an operator control valve CV. Through the movement of a handle associated with the control valve CV, the operator can adjust the amount of braking to be applied in the air brake arrangement BA. The higher the braking force selected, the faster the braking arrangement BA will attempt to slow and stop the train TR. Alternatively, and as discussed in more detail hereinafter, the air brake arrangement BA for each railcar may also be controlled by the operator from an on-board controller OBC that transmits data signals over a trainline TL (or cable extending between the locomotive and the railcars), which may be referred to as an electronically-controlled pneumatic (ECP) air brake arrangement.

In order to provide the appropriately compressed air to the system, and in certain conventional air brake applications, the air brake arrangement BA also includes a compressor C for providing compressed air to a main reservoir MR, which is in communication with the control valve CV. Further, an equalizing reservoir ER is also in communication with the control valve CV. Whether through the main reservoir MR or the equalizing reservoir ER, compressed air is supplied through the control valve CV to a brake pipe BP that extends along and is associated with each railcar. Each railcar includes an arrangement that allows an auxiliary reservoir AR to be charged with air via a valve V, as well as a braking assembly or unit BU, such as a brake cylinder BC, which is in communication with the valve V. The brake cylinder BC is operable to urge a brake shoe mechanism BS against a surface of the wheel W.

In operation, the brake pipe BP is continually charged to maintain a specific pressure, e.g., 90 psi, and each auxiliary reservoir AR and emergency reservoir ER (which may be combined into a single volume, or main reservoir) are similarly charged from the brake pipe BP. In order to brake the train TR, the operator actuates the control valve CV and removes air from the brake pipe BP, thereby reducing pressure to a lower level, e.g., 80 psi. The valve arrangement V quits charging the auxiliary reservoir AR and transfers air from the auxiliary reservoir AR to the brake cylinder BC. Normally using piston-operable arrangement, the brake cylinder BC urges the brake shoe mechanism BS against the wheel W. As discussed, in conventional, non-ECP air brake systems, the operator may adjust the level of braking using the control valve CV, since the amount of pressure removed from the brake pipe BP results in a specific pressure in the brake cylinder BC, which results in a specific application force of the brake shoe mechanism BS against the wheel W. Alternatively, in the ECP air brake arrangements, the brake commands are electronic over the ECP trainline TL to each railcar.

Using the above-described air brake arrangement BA, the train can be slowed and/or stopped during operation and as it traverses the track. Further, each railcar is typically equipped with a manual parking brake PB for securing each car when parked or stopped, and in order to ensure that the train does not move or shift. Still further, certain railcars may be equipped with a hatch reservoir HR to provide air to a pneumatically-operable hatch or door of the railcar.

In order to provide further control to the air brake arrangement BA, ECP brake arrangements can be used. As discussed, control signals can be transmitted from the on-board controller OBC, typically located in the cabin of the locomotive, to one or more of the railcars over the trainline TL. Each railcar is normally equipped with a local controller LC, which is used to monitor and/or control certain operating parameters in the air brake arrangement BA, such as the air reservoirs and/or the valve arrangement V. In this manner, the operator can broadcast brake commands to the railcars to ensure a smooth, efficient, and effective braking operation. This local controller LC typically includes the appropriate processor and components to monitor and/or control various components of the air brake arrangement BA.

As discussed above, conventional freight cars have manual parking brakes PB, which provide a mechanical locking of brakes, based upon user operation of a wheel to apply force to a chain connected to a brake lever system. Actuation of these manual parking brakes PB causes the brake shoe mechanisms BS to contact the wheel W. Operating rules are established by railroads, which require application of the parking brake PB under a variety of conditions. The most common condition is when "setting a car off" from the train TR, in order to park it in a yard or siding track. However, as referred to above, the manual parking brakes PB are also used to secure a train TR under failure (or emergency) conditions when in mainline operation. For example, these manual parking brakes PB may be used when a train TR failure exists, where the locomotives are no longer able to maintain brake pipe BP pressure. Another such condition exists when a crew needs to secure the train TR and leave the locomotive unmanned. A still further condition arises when the train TR suffers a "break-in-two" event, leaving a group of cars without a locomotive.

The "break-in-two" event and other conditions requiring the stopping of a train TR are addressed through exhausting the brake pipe BP, which will lead to an emergency brake application. Typical air brake systems, even if maintained to AAR standards, can have a brake cylinder leak rate of up to 1 psi per minute, which are considered to be within acceptable leakage rates. This level is normally used to provide a time guideline for train crews to gauge when to manually apply the manual parking brakes PB and secure the train TR. The number of cars that require this parking brake application may vary based on the number of cars in the train consist, as well as the average grade of the track. Crews normally need to apply the manual parking brakes PB within about a half hour after the condition arises, and after the parking brakes PB are applied, the brake cylinder BC can leak to zero, such that the car will be secured.

There exists a need in the industry to reduce the need for the crew to manually apply the parking brakes PB. This is primarily based upon the desire to reduce the risk of injury to the crew involved in such manual field operations. This need is also rising with the trend towards single person-operated trains, with some railroads planning for future unmanned operations. While some potential solutions may involve locking schemes in the brake cylinder BC and powered hand brakes, such arrangements represent complex and costly solutions.

SUMMARY OF THE INVENTION

Generally, provided is a brake monitoring system and an air brake arrangement that address and/or overcome some or all of the drawbacks and deficiencies that exist in braking systems, particularly with respect to the use of hand, parking, and/or emergency brakes. Preferably, provided is a brake monitoring system and an air brake arrangement that are useful in connection with an air brake arrangement of a train and/or railway vehicle. Preferably, provided is a brake monitoring system and an air brake arrangement that are useful in connection with an electronically-controlled pneumatic (ECP) braking system of a train. Preferably, provided is a brake monitoring system and an air brake arrangement that monitor and/or control one or more components of an air brake arrangement of a railcar. Preferably, provided is a brake monitoring system and an air brake arrangement that monitor air leakage in one or more components of an air brake arrangement for use in determining the need for or time before which manual parking brakes should be applied.

Therefore, in one preferred and non-limiting embodiment, provided is a brake monitoring system for an air brake arrangement including at least one reservoir configured to deliver air to at least one air-operable braking assembly for braking at least one wheel (and, typically, a truck consisting of 4 wheels) of a vehicle. The brake monitoring system includes: at least one sensor configured to measure air pressure in at least one component of the air brake arrangement; at least one local controller configured to determine air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and at least one communication device configured to transmit at least a portion of the air brake data to at least one of the following: a remote controller, a central controller, a vehicle controller, an on-board controller of a locomotive, a central dispatch system, or any combination thereof.

In another preferred and non-limiting embodiment, and in an air brake arrangement including at least one reservoir configured to deliver air to at least one air-operable braking assembly for braking at least one wheel of a vehicle, provided is a brake monitoring system including: at least one sensor configured to measure air pressure in at least one component of the air brake arrangement; at least one local controller configured to determine air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and at least one communication device configured to transmit at least a portion of the air brake data to at least one of the following: a remote controller, a central controller, a vehicle controller, an on-board controller of a locomotive, a central dispatch system, or any combination thereof.

In a still further preferred and non-limiting embodiment, provided is a computer-implemented method of determining air brake data in an air brake arrangement including at least one reservoir configured to deliver air to at least one air-operable braking assembly for braking at least one wheel of a vehicle. The method includes: sensing air pressure in at least one component of the air brake arrangement; determining air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and transmitting at least a portion of the air brake data to at least one of the following: a remote controller, a central controller, a vehicle controller, an on-board controller of a locomotive, a central dispatch system, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

According to one preferred and non-limiting embodiment of the present invention, provided is a brake monitoring system 10 and method for an air brake arrangement 12 used in connection with a railcar R, which is part of a consist making up a train TR. Certain preferred and non-limiting embodiments of the brake monitoring system 10 and air brake arrangement 12 are illustrated in schematic form in FIGS. 2-4.

It should be noted that while the system 10, method, and arrangement 12 of the present invention are specifically discussed herein with connection to a pneumatically-driven brake arrangement (air brakes) for a train TR or railway vehicle, they are equally applicable and useful in connection with a variety of braking arrangements and applications involving vehicles with air-based braking systems. Accordingly, the system 10, method, and arrangement 12 may also be used in connection with roadway vehicles, such as cars, trucks, buses, etc. For example, many of these vehicles include similar braking arrangements that use pneumatic-driven braking systems for slowing or stopping the vehicle. Accordingly, while predominantly discussed in connection with railway vehicles, all similar applications are envisioned and may be used in connection with the system 10, method, and arrangement 12 of the present invention.

Similarly, the system 10, method, and arrangement 12 of the present invention can be used in a variety of types of braking arrangements and braking systems used in the railroad industry. In particular, the presently-invented system 10, method, and arrangement 12 are equally useful in connection with the brake arrangement of a railcar, as well as the brake arrangement of the locomotive or engine. Still further, while the system 10, method, and arrangement 12 of the present invention is preferably used in connection with electronically-controlled pneumatic (ECP) air brake systems, it can also be used in connection with dynamic braking systems, blended or combination braking systems, emergency braking systems, and the like.

Figure 1:
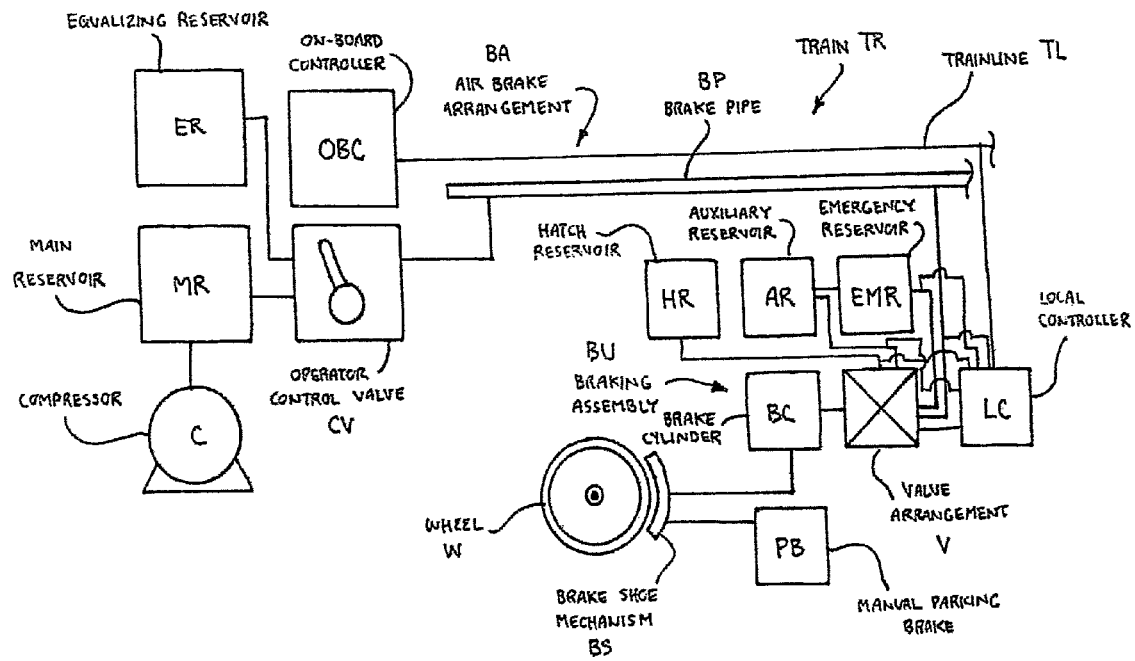
FIG. 1 is a schematic view of an air brake arrangement for a train according to the prior art.
Figure 2:
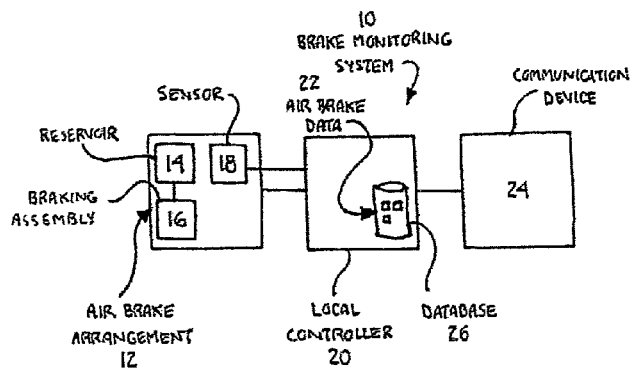
FIG. 2 is a schematic view of one embodiment of a brake monitoring system for an air brake arrangement according to the principles of the present invention.

As illustrated in FIG. 2, and in one preferred and non-limiting embodiment of the present invention, the system 10 includes one or more sensors 18 that are attached to, integrated with, or in fluid communication with at least one component of the air brake arrangement 12 and/or braking assembly 16. In this embodiment, one or more sensors 18 are operatively positioned and used to measure air pressure in or around one or more of the components of the air brake arrangement 12 and/or the braking assembly 16. While discussed specifically in connection with a measurement of air pressure, the sensor 18 may also be configured or adapted to measure other air-based or air-related data, such as flow and the like.

In this embodiment, the system 10 also includes a local controller 20 configured, adapted, or programmed to determine air brake data 22. In one preferred and non-limiting embodiment, the local controller 20 is used to determine air brake data 22 based at least partially on the air pressure measured or detected by the sensor 18. Still further, this air brake data 22 may include a variety of data points and information, including, but not limited to, air pressure in at least one component of the air brake arrangement 12 and/or braking assembly 16, air pressure over time in at least one component of the air brake arrangement 12 and/or braking assembly 16, air leakage in the air brake arrangement 12 and/or braking assembly 16, air leakage rate in the air brake arrangement 12 and/or braking assembly 16, air leakage in one or more of the components of the air brake arrangement 12 and/or the braking assembly 16, brake holding prediction data, air level data, and the like. Accordingly, this air brake data 22 provides valuable data and information for further processing or use in making determinations for effective and controlled train operation.

For example, some or all of this air brake data 22 can be used in determining how long air or air pressure can be supplied to one or more of the components of the air brake arrangement 12 and/or braking assembly 16, which is particularly useful in certain emergency events where the main supply of air has been terminated or affected. Specifically, the system 10 of the present invention can determine how long air from one or more of the other air reservoirs 14 will be available to hold the braking assembly 16 in the braked position. This, in turn, will provide the operator with a timeline or guidance regarding how much time the crew has to deploy or start deploying one or more of the manual parking brakes PB or mechanical brakes on one or more of the railcars of the train TR.

As also illustrated in FIG. 2, the system 10 of this embodiment includes at least one communication device 24 that is configured, adapted, or programmed to transmit at least a portion of the air brake data 22 to a further computer or control system, such as a remote controller, a central controller, a vehicle controller, an on-board controller of a locomotive, a central dispatch system, or the like. This communication device 24 may use a variety of architectures and communication techniques, in both a wireless and hard-wired format. For example, the communication device 24 may communicate over a hard-wired cable (the trainline TL) that extends through and between the various railcars of train TR, over the rails of the track, and/or over a wireless connection or link either between railcars or between the railcar and the locomotive.

As discussed hereinafter, the local controller 20 may be in a variety of forms, including a separate computer or computerized system or component, or a computerized system or component that is integrated with existing hardware and/or software. Further, the local controller 20 includes the appropriate hardware, software, firmware, and the like in order to receive, process, and/or transmit data, such as some or all of the air brake data 22 (as well as the raw data obtained from the sensor 18). Any known computing device and/or interface can be used in connection with, integrated with, or in replacement of the local controller 20. Further, and as also shown in FIG. 2, some or all of the air brake data 22 (and/or the raw data from the sensor 18) may be stored in a local database 26, which may be resident on or present at the local controller 20. However, and again, this database 26 may be established as part of an existing database, e.g., the train or track database in the on-board controller of the locomotive, the central databases at central dispatch, and the like.

As discussed above in connection with FIG. 2, and in one preferred and non-limiting embodiment, the component with which the sensor 18 is interacting or observing is in the form of an air reservoir 14. Of course, in many situations and environments, multiple air reservoirs are provided in connection with the air brake arrangement 12 and/or braking assembly 16, including, but not limited to, one or more auxiliary reservoirs 28, one or more emergency reservoirs 30, and one or more hatch reservoirs 32. Further any two or more of these reservoirs 14 may be combined and/or in fluid communication to create a specified storage volume, such as a main reservoir. Any one or more of these reservoirs 28, 30, 32 may be placed in fluid communication with or configured to deliver air to any component of the air brake arrangement 12, such as the braking assembly 16. Accordingly, when air can no longer be delivered from the brake pipe BP, air is instead provided through one or more of these air reservoirs 28, 30, 32.

In this manner, and as discussed, the braking assembly 16 is provided with the appropriate air and air pressure to maintain the brakes in a closed position. However, and as expected in such air brake arrangements 12, leakage occurs in these air reservoirs 14. While certain leakage is acceptable, it is desirous to better understand the air brake data 22 associated with one or more of these reservoirs 14 in order to calculate or determine with more accuracy how long the air brakes will be functional (after which the manual parking brakes PB must be used. Accordingly, some or all of the air brake data 22 discussed above can be used in making such a determination, as well as making further determinations about holding times, braking predictions, and other important parameters.

Figure 3:
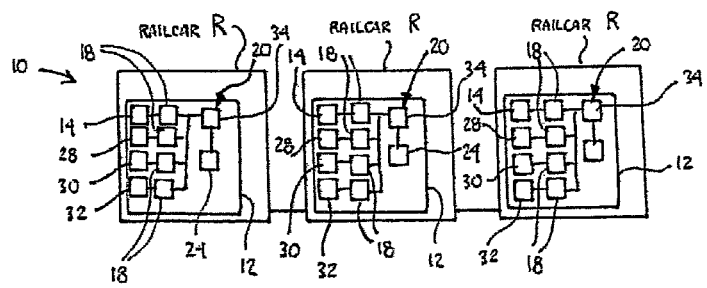
FIG. 3 is a schematic view of another embodiment of a brake monitoring system for an air brake arrangement according to the principles of the present invention.

As seen in FIG. 3, and in one preferred and non-limiting embodiment, sensors 18 are used in connection with one, a portion of, or all of these reservoirs 28, 30, 32 for each particular railcar R. Accordingly, the air brake data 22 can be collected or obtained from certain specified or all of the railcars R in order to make braking determinations and decisions for the entire train TR. This allows for a more effective plan to be implemented regarding the use of the manual parking brakes PB, as well operation in other emergency situations. Again, some or all of this air brake data 22 can be transmitted or delivered over existing cables (trainline TL) extending between railcars R, rails of the track, and/or or existing communication channels in a wireless format.

In a further preferred and non-limiting embodiment, one or more of the sensors 18, local controllers 20, and/or communication devices 24 are partially or wholly combined or integrated into a unified system. Accordingly, it is envisioned that the combined system is capable of measuring or sensing information or parameters about air in the air brake arrangement 12 and/or braking assembly 16, processing this data and information to obtain, provide, and/or determine the air brake data 22, and transmit or otherwise communicate this information to other systems 10, and/or to other remote controllers, such as the on-board controller OBC, central dispatch, and the like. The system 10 may include a variety of communicating components, whether remote or local, where the system 10 determines the appropriate air brake data 22 in order to make the above-discussed control systems regarding operation of the train TR.

In another preferred and non-limiting embodiment, the local controller 20 is integrated with or in the form of an existing controller 34. Accordingly, the local controller 20 may be in communication with such an existing controller 34, incorporated with the existing controller 34, programmed as part of the existing controller 34, and/or integrated with the existing controller 34. In this embodiment, the presence of the existing controller 34 on or within the air brake arrangement 12 of one or more of the railcars R is leveraged for use within the presently-invented system 10. For example, and when used in connection with an electronically-controlled pneumatic (ECP) braking arrangement, the air brake arrangement 12 of each railcar R normally includes a local controller LC (or control components) that control and/or monitor various of the parts and components within the air brake arrangement 12 and/or braking assembly 16. Therefore, this existing controller 34 can be configured, adapted, or programmed to further interact with the sensors 18 and determine the air brake data 22. Of course, this existing controller 34 may be any remote controller or computer on or in communication with the train TR.

This same concept applies for the communication device 24, which may be integrated with, in communication with, incorporated with, or programmed as part of an existing communication device or communication medium/architecture of the train TR. Still further, and with respect to the air brake data 22, at least a portion of this air brake data 22 may be determined on a dynamic basis, a periodic basis, continually, on a predetermined basis, prior to departure, during operation, and/or during an emergency event. Therefore, this air brake data 22 could be utilized to make important operational and control decisions before, during, and/or after train operation and/or emergency event.

Figure 4:
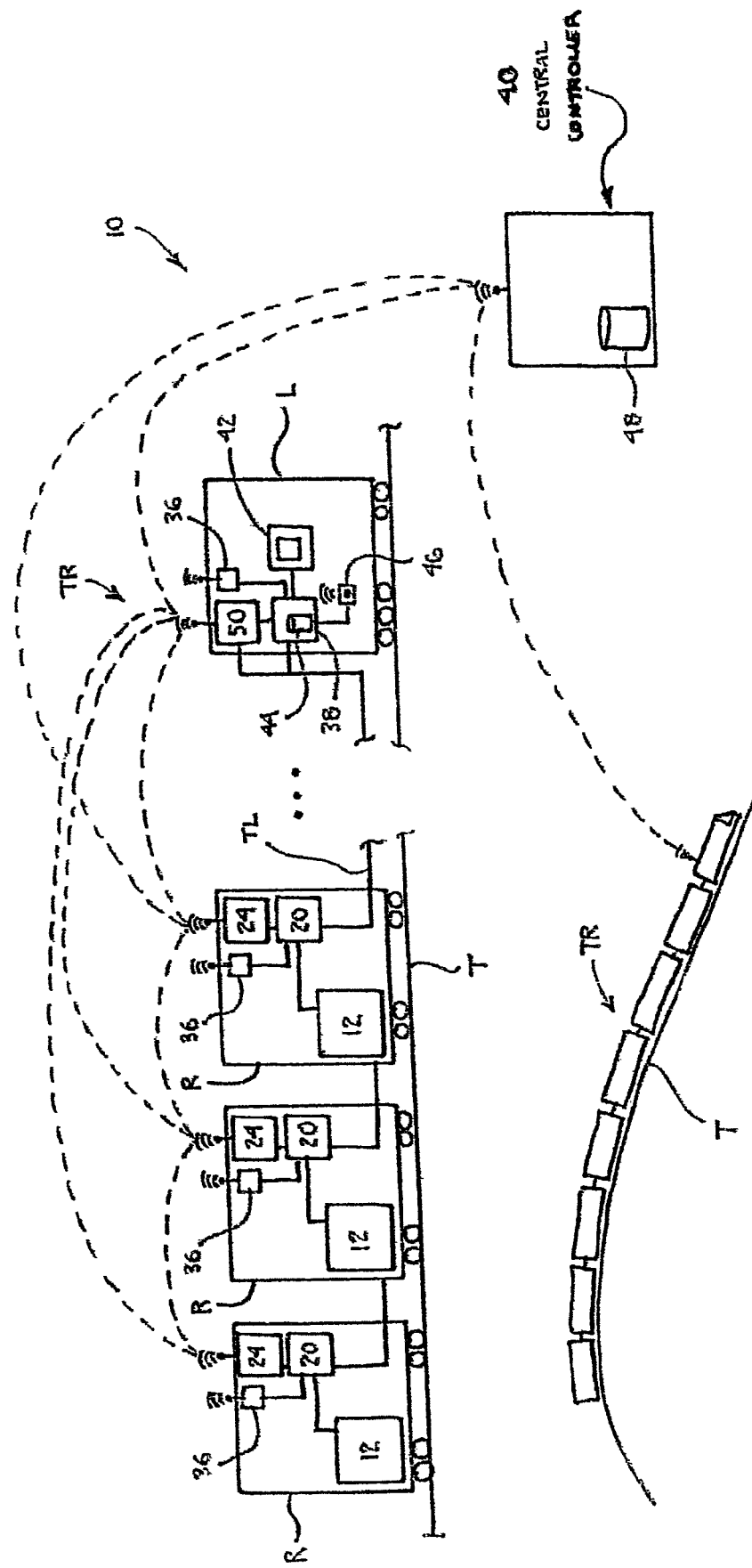
FIG. 4 is a schematic view of a further embodiment of a brake monitoring system for an air brake arrangement according to the principles of the present invention.

In a still further preferred and non-limiting embodiment, and as illustrated in FIG. 4, the system 10 may also include at least one positioning system 36 that is configured to generate position data relating to the train TR, a portion of the train TR, one or more of the railcars R, and the like. Accordingly, while a positioning system 36 is normally used at one or both of the end-of-train or head-of-train, it is envisioned that such a positioning position 36 can be used and/or integrated with any of the railcars R of the train TR. Further, any one or more of these positioning systems 36, such as in the form of a Global Positioning System (GPS) unit, can be configured, adapted, or programmed to determine the position of a vehicle, the position of a train TR in a track network, the position of at least one railcar R of a train TR in a track network, the position of at least one locomotive of a train TR in a track network, the grade of a road, and/or the grade of a track T.

In one preferred and non-limiting embodiment, the grade of the track T is used in making a braking decision, along with or as part of the air brake data 22. In particular, when making a determination of how long one or more of the air reservoirs 14 can supply or deliver air to the braking assembly 16 (and, thus, appropriately apply the brakes), the grade of the track T can be used as an additional factor in making an accurate determination. As seen in FIG. 4, certain railcars R of the train TR are in a substantially flat grade of the track T, while others are in a substantially sloped grade of the track T. Among other considerations, the slope or grade of the track T can be used (as part of or calculated using part of the air brake data 22) to make decisions about how long the brakes can hold, and when the mechanical or manual parking brakes PB must be utilized. Further, information from the positioning systems 36 and/or other train data can used to make determinations regarding the use of the manual parking brakes PB of specific railcars R. This provides a more managed approach to be used as to which of the manual parking brakes PB of which railcar R should be deployed and when. Furthermore, deciding between the manual parking brakes PB of different cars can also be part of the decision-making process based upon the grade of the track T.

With continued reference to FIG. 4, and in this preferred and non-limiting embodiment, at least a portion of the air brake data 22 is directly or indirectly transmitted to or communicated to an on-board controller 38 of a locomotive L of the train TR. In this embodiment, the on-board controller 38 (which represents an existing unit (OBC) used in connection with at least partially automated trains TR) determines at least one air brake arrangement condition based at least partially on the air brake data 22. Further, at least a portion of the air brake data 22 and/or at least one air brake arrangement condition may be directly or indirectly transmitted or communicated to a central controller 40, such as a central dispatch system.

Further, in this preferred and non-limiting embodiment, and based at least partially on at least a portion of the air brake data 22 of the local controller 20 and/or at least one air brake arrangement condition, the central controller 40 is configured to determine further air brake data and/or air brake arrangement condition data or information. For example, this additional information may include air pressure in at least one component of the air brake arrangement 12 and/or braking assembly 16, air pressure over time in at least one component of the air brake arrangement 12 and/or braking assembly 16, air leakage in the air brake arrangement 12 and/or braking assembly 16, air leakage rate in the air brake arrangement 12 and/or braking assembly 16, brake holding prediction data, air level data, and the like. This allows this central controller 40 to assist in the management and operation of the train TR within a track network, as well as the control of multiple trains TR traversing the track network. Still further, at least a portion of this additional information, such as in the form of air brake data, air brake arrangement condition, control data, operational data, and the like may be transmitted or communicated to the local controller 20, a remote controller, at least one other central controller, a vehicle controller, the on-board controller 38 of a locomotive L, a central dispatch system, and the like.

With continued reference to FIG. 4, the on-board controller 38 of the locomotive L may be in further communication with a visual display device 42, which is used to present data and information to the operator of the train TR. For example, in one embodiment, a message or other visual indicia is displayed to the operator on the visual display device 42, and the content of this message or visual indicia may include some or all of the air brake data 22 and/or an air brake arrangement condition. Further any of this data can be stored on a locomotive database 44 integrated with or in communication with the on-board controller 38.

Still further, this message or visual indicia may provide information and data to the operator of the train TR regarding the status of the air brake arrangement 12 of any particular railcar R, the status of the braking assembly 16 of any particular railcar R, the condition surrounding any of these air brake arrangements 12 and/or braking assemblies 16, air brake data 22, and/or any data and information, such as timelines, guidance, control decisions, and the like, which could be used in making determinations for control of the train TR. For example, the operator may be provided with timing information or guidelines as to when and which of the manual parking brakes PB should be deployed. Accordingly, the operator may use some or all of the air brake data 22 or other information provided by the system 10 to control or operate the train TR in a safe manner, such as by operating at a specified speed limit, slowing the train TR, stopping the train TR, using a suggested air brake arrangement 12 and/or braking assembly 16, parking the train TR on a specified location of the track TR (according to grade), communicating with the crew about deploying the manual parking brake PB on one or more of the railcars R, and the like.

As further illustrated in FIG. 4, an alarm device 46 is provided in a locomotive L and integrated with or in communication with the on-board controller 38. The alarm device 46 is configured to provide some alarm or other indication to the operator of the train TR based upon some or all of the air brake data 22 and/or some air brake arrangement condition. For example, the alarm may be in the form of an audio alarm, a visual alarm, a tactile alarm, and the like. Based upon the nature and content of the alarm, the operator can manually control the train TR to achieve a safe situation, or alternatively, the system 10 may be configured, adapted, or programmed to automatically implement or enforce such control through the control system or on-board controller 38.

As discussed above, the local controller 20 may be in the form of, integrated with, or replaced with an existing controller 34, which, in another preferred and non-limiting embodiment, may be in the form of the on-board controller 38. As discussed, such on-board controllers 38 are known in the industry, and may be part of a positive train control (PTC) system, such as the Electronic Train Management System (ETMS) of Wabtec. Such systems often rely upon various databases and on-board analyses to provide the operator with accurate train control information, as well as to confirm safe train operation. Accordingly, the local controller 20 of the system 10 of the present invention may be integrated and/or replaced with such a known on-board controller 38.

In a further preferred and non-limiting embodiment and in order to obtain appropriate data and information from remote locations, the communication device 24 (whether local to the railcar R or local on the train TR (e.g., as part of the on-board controller 38)) may include a receiver 50. This receiver 50 receives data, such as the air brake data 22 and/or some other train or track data, thereby ensuring that the most accurate data is available to the overall train control system for determining the above-discussed brake control decisions. This receiver 50 may be a transceiver, a receiver capable of receiving and/or transmitting wireless signals, and/or a receiver capable of receiving hard-wired (e.g., trainline TL and/or rail-based signals). This receiver 50 may obtain data from a variety of sources, e.g., a central dispatch system (or central controller 40), a wayside unit, a wayside-based detection system, an off-board database 48, and the like.

As also discussed above, some or all of the air brake data 22 and/or some air brake arrangement condition (or other similar data), braking data, train data, track data, position data, and the like, may be provided to a remote central controller 40, and stored in a database 48. As discussed, this central controller 40 is in communication with the on-board controller 38 and/or the local controllers 20 on one or more of the railcars R of the train TR via the receiver 50 and/or the communication devices 24 discussed above. Therefore, any important braking information, deployment of the manual parking brake PB, or other train control information and data can be communicated to the train TR for use in making train control decisions. Any number of communication paths and data transfer processes are envisioned within the context and environment of the present invention, such that the appropriate train control decisions can be made based upon the measurements of the sensors 18 and/or the air brake data 22.

As discussed above, the presently-invented brake monitoring system 10 can be used in connection with a variety of air brake arrangements 12 and/or braking assemblies 16. For example, and in one preferred and non-limiting embodiment, the braking assembly 16 is in the form of a known brake cylinder/piston arrangement, which is effective in urging the brake shoe mechanism BS against the wheel W of the railcar R of the train TR. However, in another embodiment, the braking assembly 16 is in the form of a bladder that can be expanded and deflated through injection of air, which, as discussed above, urges the brake shoe mechanism BS against the wheel W. One example of this bladder-type braking assembly is the UBX-type braking assembly of Wabtec. By using such a bladder-type braking assembly, the most common source of air leakage, namely leakage in the brake cylinder BC during operation, is eliminated. Further, this bladder-type braking assembly provides the ability to fully seal the air, in a manner similar to automobile tires and the like. In another preferred and non-limiting embodiment, the air brake arrangement 12 includes an ECP control valve manifold, which is designed to pneumatically connect the reservoir 14 to the braking assembly 16 following the loss of pressure in the brake pipe BP. This pneumatic connection is retained even after electrical power to the ECP manifold is removed. Further, it is envisioned that this ECP control valve manifold functions in connection with or is integrated with the local controller 20.

As discussed above, the system 10 of the present invention can implement or use a variety of measurements (as provided by the sensor 18). For example, in one preferred and non-limiting embodiment, two levels of air leak measurement are provided. One level of air leak measurement is provided in the form of departure testing, which is a "low leak" measurement for determining air brake data 22, such as in the form of predicting the brake holding capacity or capability for each railcar R in the train TR. A second level of leak measurement is an ongoing "mid leak" alarm measurement, which provides air brake data 22 in the form of a warning if a railcar R is showing a change in holding capacity during normal brake applications. Again, such a measurement may produce information and data sufficient to trigger the alarm device 46 in the locomotive L. Further, it is envisioned that the system 10 can provide any level of air leak measurement using air pressure, flow, or the like, and represents a pneumatic-control approach for determining air leakage and other changes during normal brake applications.

As discussed above, and in another preferred and non-limiting embodiment, the brake monitoring system 10 provides a variety of ways of communicating air leak information (and/or air brake data 22). One means of communication is over the ECP trainline TL (such as by cable) to the controlling locomotive L to provide information to the crew if railcars R have leaks above a defined level. This information can be provided in the form of alarm activation or other indication to the operator. This will be useful in identifying railcars R where the manual parking brake (or hand brake) PB will need to be set within a defined time. Another manner of communication is through the use of a data radio (as the communication device 24) positioned on each railcar R, which sends air brake data 22, such as alarm messages or similar data, to a maintenance back office application, such as in the form of a central controller 40 (or central dispatch system). Of course, this wireless communication may occur through a cellular format, a satellite format, and/or any other type of effective data radio transmission, with the ability to communicate to the central office application. It is further envisioned that the air brake data 22 can be sent to the locomotive L, such as over the trainline TL, and thereafter, relayed to the central controller 40, as discussed above. Similarly, the information and data from the positioning system 36 provided on one or more of the railcars R and/or locomotive L can be sent directly or indirectly to the central controller 40, such as directly to the central controller 40 (or some other remote controller), or as relayed by the on-board controller 38 in the locomotive L.

In a still further preferred and non-limiting embodiment, the maintenance back office application (or central controller 40) is provided with the appropriate communication systems and devices to provide data back to the train TR in order to provide further air brake data 22, such as air holding prediction times for certain railcars R of interest. This communication may also be implemented using a variety of means and devices, such as direct wireless connections between the central controller 40 and one or more of the railcars R of the train TR, or back to the locomotive L using the standard wireless communication techniques. Still further, the central controller 40 may be configured, adapted, or programmed to provide periodically updated calculations of predicted railcar R holding times, at least partially based upon the air brake data 22, the data from the sensors 18, and/or information or data from the positioning systems 36. In addition to analyzing the air-brake data 22 for individual railcars R, this analysis and determination process may be on a car consist and/or train TR basis. For example, one railcar R out of a 10-railcar consist may completely lose its air-holding capacity without the need for maintenance attention. The logic at the central controller 40 (and/or the on-board controller 38) may also be enhanced by using the positioning system 36 information and data from the railcars R, as referenced to a track database 38, to determine the grade and minimum brake cylinder pressure per railcar R consist as needed to safely hold the coupled group of railcars R.

As discussed above, and in another preferred and non-limiting embodiment, some railcars R may be equipped with pneumatically-operated door or hatch systems, which include a hatch reservoir 32 to support and operate these systems. Where equipped, a small pneumatic line, with a choke and a check valve, can be connected between the hatch reservoir 32 and the auxiliary reservoir 28 and/or emergency reservoir 30 (or any of the reservoirs 14 in the air brake arrangement 23). This provides the functional ability to increase the pneumatic capacity to hold air and compensate for small leaks for a long period of time. In this embodiment, this line may have a choke sized to be only slightly larger than the highest acceptable brake cylinder leak rate, such that there would be no significant impact to the normal emergency brake equalization pressure within the time needed for the railcar R to come to a stop. In a leak-free system, the brake cylinder BC pressure would slowly increase to equalize both the brake (auxiliary and/or emergency) reservoir and the hatch reservoir 32, as a combined system. Further, if there were a slow leak, the holding time could be extended by the combined reservoir system. A choke may also be used in the line connecting the reservoirs 14 to protect against a leak in the hatch reservoir 32, which would serve to isolate the impact to the other reservoirs 14. As discussed above, a sensor 18 may also be used in connection with this hatch reservoir 32 in order to further enhance the ability to detect holding capability, leak rates, and any other air brake data 22.

As discussed above, eliminating or minimizing air leaks is important in the operation and control of an air brake arrangement 12 for a train TR. One way of minimizing such air leaks may be through the use of the above-discussed bladder-type braking assembly 16. Other leaks may be minimized based upon the upkeep and maintenance of good pipe fittings, insulations, leak-free reservoirs, and enhanced air holding capabilities with the ECP control valve manifold. The brake monitoring system 10 of the present invention allows for the detection of air pressure, air flow, and the like, in order to determine air brake data 22, such as leak rate. Such a determination provides a reliable prediction of the railcar R holding capability through the use of the local controller 20, the on-board controller 38, and/or the central controller 40. In addition, this air brake data 22, such as leak data, may be in the form of a slow-leak measurement (as part of the ECP train TR initialization process), and/or supplemented by routine leak detection during brake applications or at any other stage of operation of the train TR.

As discussed, the brake monitoring system 10 may facilitate or implement the communication of air hold pressure and leak rate information (or any other air brake data 22) to the central controller 40 (such as a central dispatch system) to provide ongoing updates of holding capacity on an individual railcar R basis, a consist basis, a train TR basis, and the like. Further, the system 10 of the present invention can use a variety of communication techniques and platforms, such as the existing ECP trainline TL, or independent hard-wired or wireless media, such as radio data communications and the like. Further, and as discussed, the central controller 40, such as the maintenance back office server may be used to communicate further air brake data 22, such as alarms and the like, to maintenance crews, as well as confirm the holding time remaining for the railcar R, consist, and/or train TR. The communication of this information may take a variety of forms, including delivery by voice from a person with access to a workstation connected to the central controller 40, or directly by a variety of data radio alternatives, cellular communication, text messaging communication, smart phone communication, and the like.

In this manner, the brake monitoring system 10 and air brake arrangement 12 of the present invention allows crews extended time before manual parking brakes PB need to be set, which, in many cases, may eliminate the need to set them at all before the railcars R are returned to normal operation in the train TR. Similarly, the brake monitoring system 10 may be used in connection with a variety of different types of air brake arrangements 12 and/or braking assemblies 16, such as the above-discussed bladder-type brake assembly 16, which will provide further air holding times based upon their construction. For example, a freight car equipped with this brake monitoring system 10 (whether or not in connection with ECP brake control, both overlay and standalone types) and bladder-type braking assembly 16 allows the use of certain existing hardware and programmable components to provide the functionality of the brake monitoring system 10. For example, and as discussed, the local controller 20 may be in the form of an existing controller 34, which may be configured, adapted, or programmed to provide the air hold parking brake function and/or include a radio and/or data communications module. In particular, when this local controller 20 is in the form of an existing controller 34, it would already have the appropriate configuration or programming to access brake cylinder BC, braking assembly 16, and/or reservoir 14 pressures. Still further, the use of an existing communication device 24 and/or communications module (on the local controller 20 and/or existing controller 34) can be configured, adapted, or programmed to report railcar R location and other air brake arrangement 12 and railcar R information, in addition to the air hold parking brake status. Such additional information or data may be obtained from other sensors equipped on the railcar R with interfaces to the local controller 20.

In a still further preferred and non-limiting embodiment, at least one other or separate air reservoir 14 may be in fluid communication with at least one other air reservoir 14 of or within the air brake arrangement 12. In this embodiment, fluid communication between these separate air reservoirs 14 can be controlled. In addition, the fluid communication between these separate reservoirs may be controlled based at least partially upon the air brake data 22. This provides an additional level of control for ensuring that the proper and appropriate air reservoirs 14 are charged with air for use in an emergency or other application. For example, if the air leakage, air pressure, and/or air leakage rate is determined to be outside of acceptable limits with a specific air reservoir 14, it is envisioned that at least one other air reservoir 14 can be used then to transfer or otherwise provide air to this compromised air reservoir 14. Of course, this only represents one useful application of the air brake data 22 in making braking and other operational decisions.

One primary benefit of the brake monitoring system 10 and air brake arrangement 12 of the present invention is lowering of the recurring hardware costs for equipping freight cars to reduce the need for a manual application of the manual parking brake PB. Another advantage of the brake monitoring system 10 is that it is easily integrated with existing equipment on certain ECP-equipped railcars R, which include existing controllers 34 and existing communication devices 24. The integrated brake monitoring system 10 of the present invention provides a much preferable alternative to mechanical locking systems and arrangements. Still further, the brake monitoring system 10 and the air brake arrangement 12 of the present invention facilitates the reduction of the risk of crew injuries related to the manual operation of the manual parking brake PB. A further advantage to the brake monitoring system 10 and air brake arrangement 12 of the present invention is through the use of the existing communication platforms and systems for daily communication between the railcars R, the locomotive L, and/or the central controller 40, which then may support predictive maintenance of freight cars and other trains TR.

In this manner, and in one preferred and non-limiting embodiment, the brake monitoring system 10 and air brake arrangement 12 can be used to predict leakage rates and communication this information to the locomotive L as a first level to predict railcar R holding time following an emergency brake application. Further, and in another preferred and non-limiting embodiment, the brake monitoring system 10 and air brake arrangement 12 provide the ability to communicate revisions to the predicted brake holding times after a "break-in-two" event to provide the crew with an estimate of the railcar R brake holding time. Still further, and as discussed in connection with another preferred and non-limiting embodiment, the brake monitoring system 10 and air brake arrangement 12 can extend the braking assembly 16 holding time through the use of the hatch reservoir 32 to supplement the main air reservoir(s) to counter leakage conditions, and to extend the railcar R brake holding time. In addition, and as discussed in connection with a further preferred and non-limiting embodiment, the brake monitoring system 10 and air brake arrangement 12 can be used in connection with a bladder-type braking assembly 16 (as opposed to a known air cylinder-type braking assembly 16) to further minimize air leakage in the air brake arrangement 12, and extend the railcar R brake holding time.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A brake monitoring system for an air brake arrangement comprising at least one reservoir configured to deliver air to at least one air-operable braking assembly for braking at least one wheel of a vehicle, the brake monitoring system comprising:

at least one sensor configured to measure air pressure in at least one component of the air brake arrangement;

at least one local controller configured to determine air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and at least one communication device configured to directly or indirectly transmit or communicate at least a portion of the air brake data to at least one of the following: a remote controller, a central controller, a vehicle controller, an on-board controller of a locomotive, a central dispatch system, or any combination thereof, wherein the air brake data comprises the brake holding prediction data.

2. The brake monitoring system of claim 1, wherein the at least one component comprises the at least one air reservoir.

3. The brake monitoring system of claim 2, wherein the at least one air reservoir comprises at least one of the following: at least one auxiliary reservoir, at least one emergency reservoir, at least one hatch reservoir, or any combination thereof.

4. The brake monitoring system of claim 2, wherein the at least one air reservoir comprises a plurality of air reservoirs, and wherein the air brake data comprises at least one of the following: air pressure in the plurality of air reservoirs, air pressure over time in the plurality of air reservoirs, air leakage in the plurality of air reservoirs, air leakage rate in the plurality of air reservoirs, brake holding prediction data based upon the air brake data for the plurality of reservoirs, air level data of the plurality of reservoirs, or any combination thereof.

5. The brake monitoring system of claim 1, wherein the braking assembly is a bladder-based braking mechanism.

6. The brake monitoring system of claim 1, wherein the air brake arrangement comprises an existing controller, and wherein the at least one local controller is at least one of the following: in communication with existing controller, incorporated with the existing controller, programmed as part of the existing controller, integrated with the existing controller, or any combination thereof.

7. The brake monitoring system of claim 1, wherein at least a portion of the air brake data is determined on at least one of the following bases: dynamically, periodically, continually, predetermined, prior to departure, during operation, during an emergency event, or any combination thereof.

8. The brake monitoring system of claim 1, wherein the at least one communication device transmits at least a portion of the air brake data over at least one of the following: a wire, a cable, a communication line, an existing communication line, or any combination thereof.

9. The brake monitoring system of claim 1, wherein the at least one communication device transmits at least a portion of the air brake data wirelessly.

10. The brake monitoring system of claim 1, further comprising at least one positioning system configured to generate position data.

11. The brake monitoring system of claim 10, wherein at least a portion of the position data is processed to determine at least one of the following: the position a vehicle, the position of a train in a track network, the position of at least one railcar of a train in a track network, the position of at least one locomotive of a train in a track network, the grade of a road, the grade of a track, or any combination thereof.

12. The brake monitoring system of claim 1, wherein the air brake arrangement is equipped on at least one car of a train, and at least a portion of the air brake data is transmitted or communicated to an on-board controller of a locomotive of the train.

13. The brake monitoring system of claim 12, wherein the on-board controller determines at least one air brake arrangement condition based at least partially on the air brake data.

14. The brake monitoring system of claim 12, wherein at least a portion of at least one of the air brake data and at least one air brake arrangement condition is directly or indirectly transmitted to a central controller.

15. The brake monitoring system of claim 14, wherein, based at least partially on at least a portion of at least one of the air brake data of the local controller and the at least one air brake arrangement condition, the central controller is configured to determine at least one of air brake data and air brake arrangement condition data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof.

16. The brake monitoring system of claim 15, wherein the at least a portion of the air brake data determined by the central controller is transmitted to at least one of the following: the local controller, the remote controller, at least one other central controller, the vehicle controller, the on-board controller of the locomotive, the central dispatch system, or any combination thereof.

17. The brake monitoring system of claim 1, further comprising at least one separate air reservoir in fluid communication with the at least one air reservoir of the air brake arrangement, wherein the fluid communication between the separate air reservoir and the at least one air reservoir is controllable.

18. The brake monitoring system of claim 17, wherein the fluid communication between the separate air reservoir and the at least one air reservoir is controlled based at least partially on the air brake data.

19. In an air brake arrangement comprising at least one reservoir configured to deliver air to at least one air-operable braking assembly for braking at least one wheel of a vehicle, a brake monitoring system comprising:

at least one sensor configured to measure air pressure in at least one component of the air brake arrangement;

at least one local controller configured to determine air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and at least one communication device configured to directly or indirectly transmit or communicate at least a portion of the air brake data to at least one of the following: a remote controller, a central controller, a vehicle controller, an on-board controller of a locomotive, a central dispatch system, or any combination thereof, wherein the air brake data comprises the brake holding prediction data.

20. A computer-implemented method of determining air brake data in an air brake arrangement comprising at least one reservoir configured to deliver air to at least one air-operable braking assembly for braking at least one wheel of a vehicle, the method comprising:

sensing air pressure in at least one component of the air brake arrangement;

determining air brake data comprising at least one of the following: air pressure in the at least one component of the air brake arrangement, air pressure over time in the at least one component of the air brake arrangement, air leakage in the air brake arrangement, air leakage rate in the air brake arrangement, air leakage in the at least one component of the air brake arrangement, air leakage rate in the at least one component of the air brake arrangement, brake holding prediction data, air level data, or any combination thereof; and transmitting or communicating at least a portion of the air brake data to at least one of the following: a remote controller, a central controller, a vehicle controller, an on-board controller of a locomotive, a central dispatch system, or any combination thereof, wherein the air brake data comprises the brake holding prediction data.

* * * * *